Oct. 6, 1970    C. G. HART    3,531,920
FILTER
Filed Sept. 16, 1968    4 Sheets-Sheet 1

INVENTOR.
CHARLES G. HART.
BY
ATTORNEY

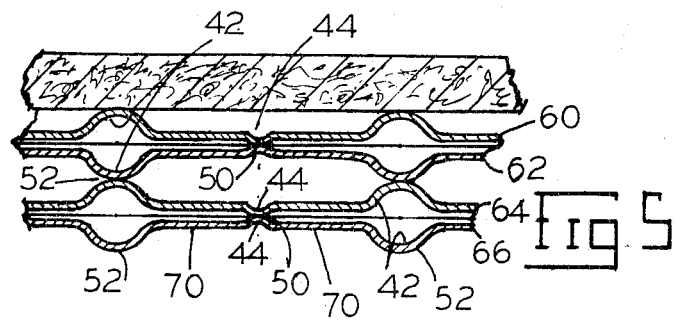
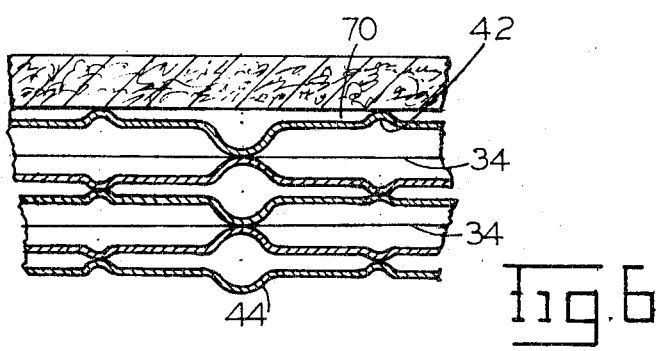
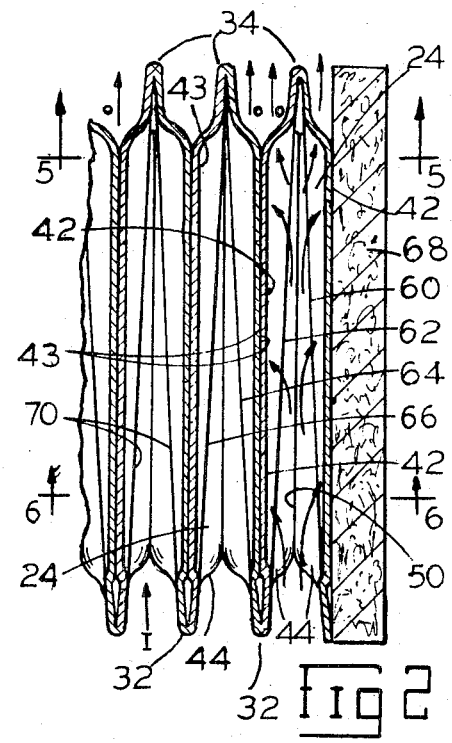
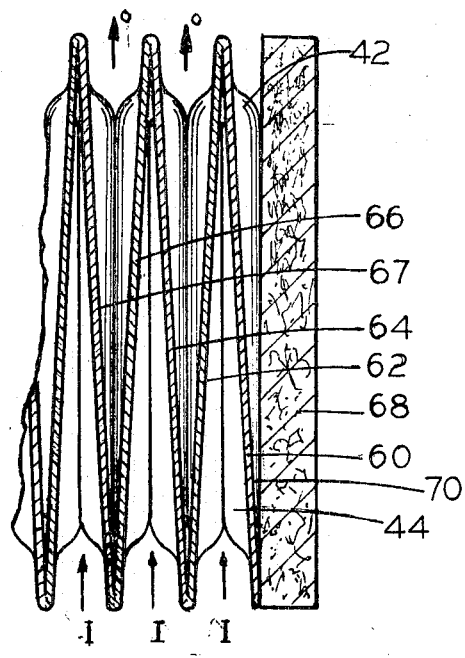
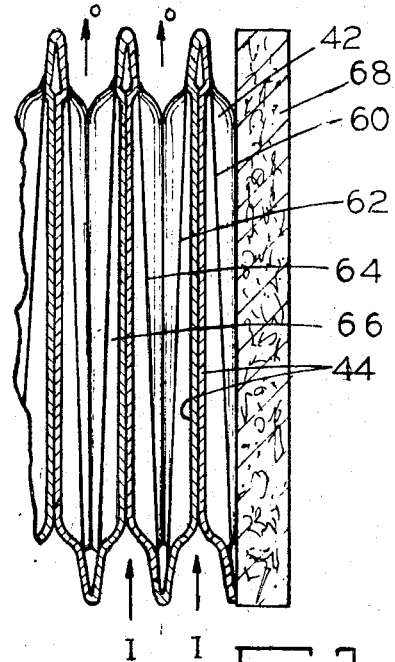
INVENTOR.
CHARLES G. HART.

Oct. 6, 1970 C. G. HART 3,531,920
FILTER
Filed Sept. 16, 1968 4 Sheets-Sheet 3

INVENTOR.
CHARLES G. HART.
BY
ATTORNEY

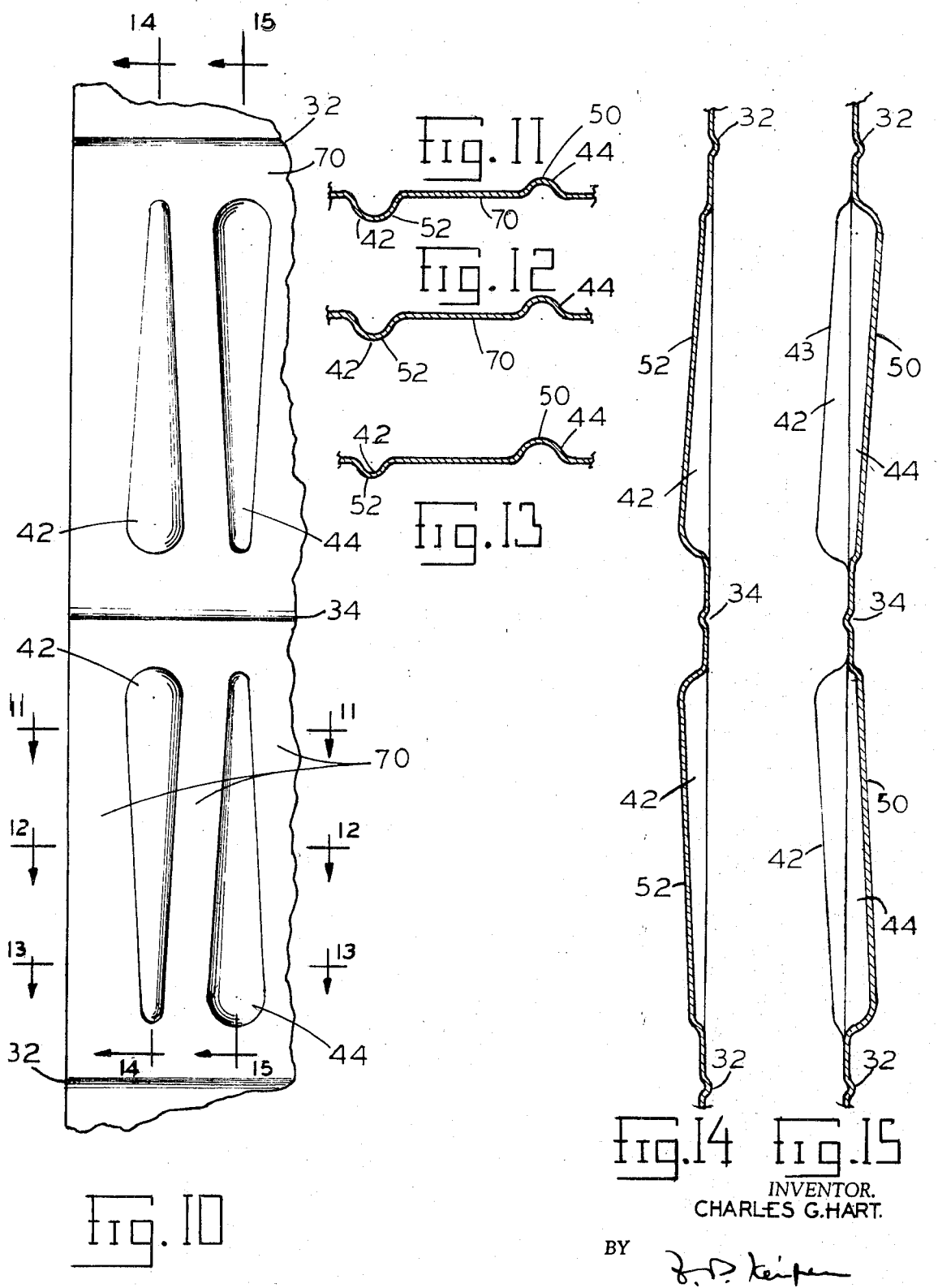

United States Patent Office 3,531,920
Patented Oct. 6, 1970

3,531,920
FILTER
Charles G. Hart, Syracuse, N.Y., assignor to Cambridge Filter Corporation, Syracuse, N.Y., a corporation of New York
Filed Sept. 16, 1968, Ser. No. 759,967
Int. Cl. B01d 27/06
U.S. Cl. 55—497                              4 Claims

ABSTRACT OF THE DISCLOSURE

Air filter comprising a filter core having a zig-zag series of like self sustaining relatively planar panels connected by alternate upstream and downstream folds, the upstream folds being uniformly spaced to provide a series of like substantially V pockets for air to enter, and the downstream folds being uniformly spaced to provide a series of substantially V pockets for filtered air to leave, each of the panels having a plurality of spacer ribs extending in a direction generally transversely of the folds formed integrally of the filter media by offsetting from the plane of the panels, the spacer ribs of adjacent panels being aligned and of a tapering height to provide line contact between ribs of adjacent panels to maintain the inclined spacing between adjacent panels against the differential pressure of air flow through the filter media of the panels.

---

This invention relates to air filters of the pleated extended area type wherein the use of spacing separators is avoided.

It has been the practice to provide disposable filters of the high efficiency type, wherein the filter media is arranged in a multiplicity of closely spaced pleats, and wherein the pleat spacing is maintained by corrugated spacers. Filter cores constructed in this manner are enclosed within surrounding rectangular frames to which the core is sealed, and the depth of the core may vary as desired, depending on how much filter area is desired per unit. The filter media in such cores comprises a series of relatively flat flanks between successive pleat folds, that are held apart by the corrugated spacers, and the sum total area of such flat flanks constitute the filter area. Since such filter units or cartridges are disposable when the accumulation of air-borne contaminants builds up sufficiently to materially increase the resistance to flow through the filter media, it is desirable to construct the units or cartridges as economically as possible and especially to avoid the use of material which does not perform a filter function.

The present invention is directed to a filter core wherein the filter media is formed by folds into a series of closely spaced rectangular panels, arranged zig-zag, the panels being relatively flat, but having integral offset inclined spaced ribs to thereby eliminate the necessity for and eliminate corrugated spacers. The invention has to do with the formation from a roll of filter media of suitable width, a series of transverse fold scores alternating in fold direction, to define a series of like rectangular panels which may be readily folded to form a pleated filter media comprising a series of like panels arranged zig-zag. The invention further has to do with the formation of offset integral ribs in each panel, extending lengthwise of the media supply, and at right angles to the fold scores, the ribs of one panel, and an adjacent panel being adapted to abut one another to provide integral spacing means as a part of the panel structure, to maintain adjacent panels out of contact, when arranged in pleated fashion. The ribs of one panel bear a mirror like relation to the ribs of the immediately adjacent panel, and the contacting ribs between adjacent panels preferably increase in height along their length as they extend away from the fold between the adjacent flanks. Alternate ribs formed in each panel are offset oppositely, and the high points of the ribs offset out of the plane of the panel or one face of the panel in one direction are reversed in relation to the ribs offset oppositely, so that the individual panels may be maintained relatively planar, while inclined with respect to adjacent panels, to form air pockets into which air may enter on one side, and air outlet pockets on the reverse side. The ribs being formed of the filter media, do not detract from the filter area, and make line contact with adjacent ribs, and by reason of the rib being in effect a corrugation, it provides a slightly extended filter area, over the area of the panel filter media from which it is formed, and adds rigidity to each panel.

The invention further has to do with the method and apparatus for the economical formation of the panel folds and ribs, whereby a pleated stack can be quickly formed.

The above and other novel features of the invention will appear more fully hereinafter from the following detailed description when taken in conjunction with the the accompanying drawings. It is expressly understood that the drawings are employed for purposes of illustration only and are not designed as a definition of the limits of the invention, reference being had for this purpose to the appended claims.

In the drawings, wherein like reference characters indicate like parts:

FIG. 2 is a fragmentary sectional view taken substantially on the line 2—2 of FIG. 1;

FIG. 3 is a fragmentary sectional view taken substantially on the line 3—3 of FIG. 1;

FIG. 4 is a fragmentary sectional view taken on the line 4—4 of FIG. 1;

FIG. 5 is a sectional view taken on the line 5—5 of FIG. 2;

FIG. 6 is a sectional view taken on the line 6—6 of FIG. 2;

FIG. 10 is a plan view of a fragmentary section of filter media as formed by the apparatus of FIGS. 7, 8 and 9 prior to being folded into pleats.

FIG. 11 is a section taken on the line 11—11 of FIG.10;

FIG. 12 is a section taken on the line 12—12 of FIG. 10;

FIG. 13 is a section taken on the line 13—13 of FIG. 10;

FIG. 14 is a section taken on the line 14—14 of FIG. 10;

FIG. 15 is a section taken on the line 15—15 of FIG. 10.

Figure 1:
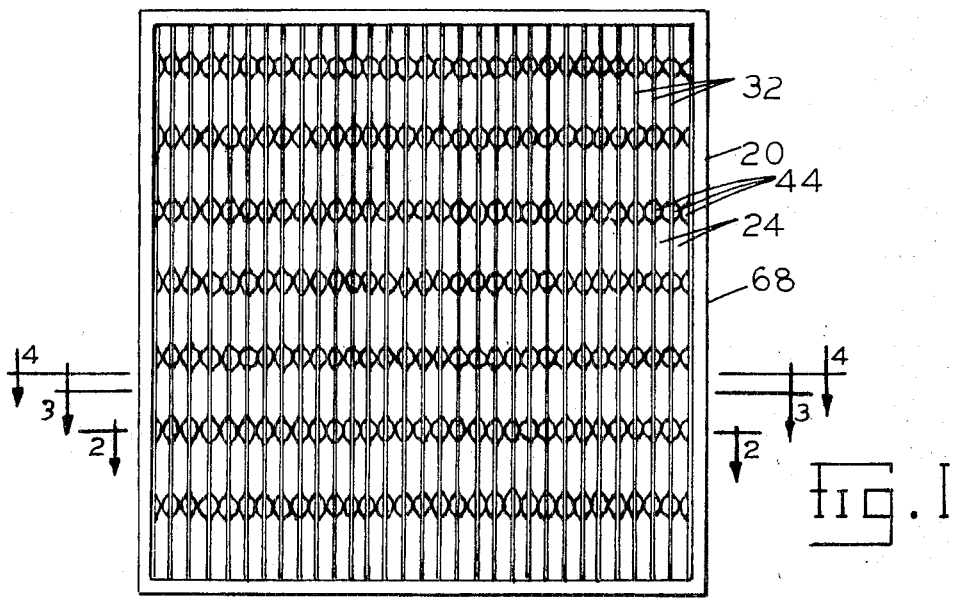
FIG. 1 is a front elevational view of a filter unit.

Referring to the drawings, in FIG. 1 there is shown a filter unit comprising a rigid rectangular frame 20 in which is positioned a length of filter media folded back and forth in zig zag fashion laterally across the frame. The folds, in the face or upstream end of the filter as shown in FIG. 1, are indicated at 32. The folds to the rear of the filter are not shown in FIG. 1, to avoid confusion, such folds being disposed at the downstream end of the pockets 24 formed by the folds, deep down in the pockets so as in practice to be difficult to observe.

Figure 7:
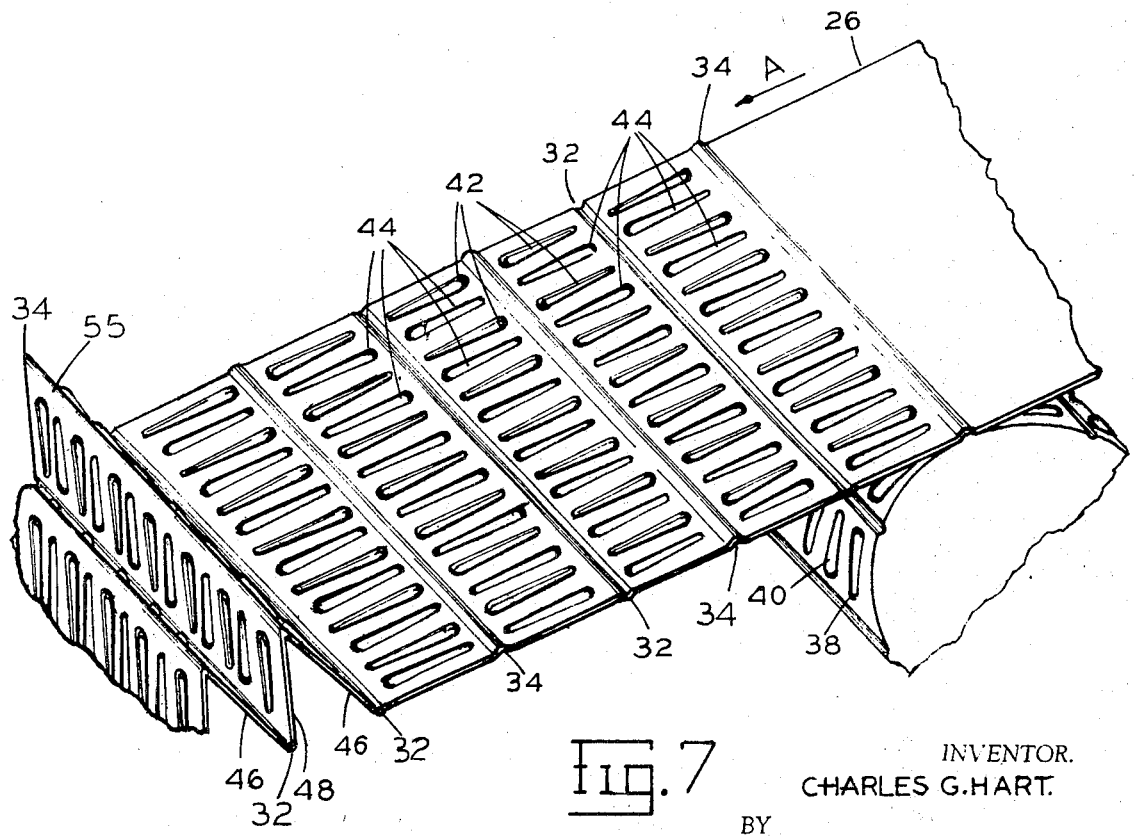
FIG. 7 is a schematic perspective view of one forming roll of a pair, and filter media formed thereby in cooperation with the second roll, not shown.
Figure 8:
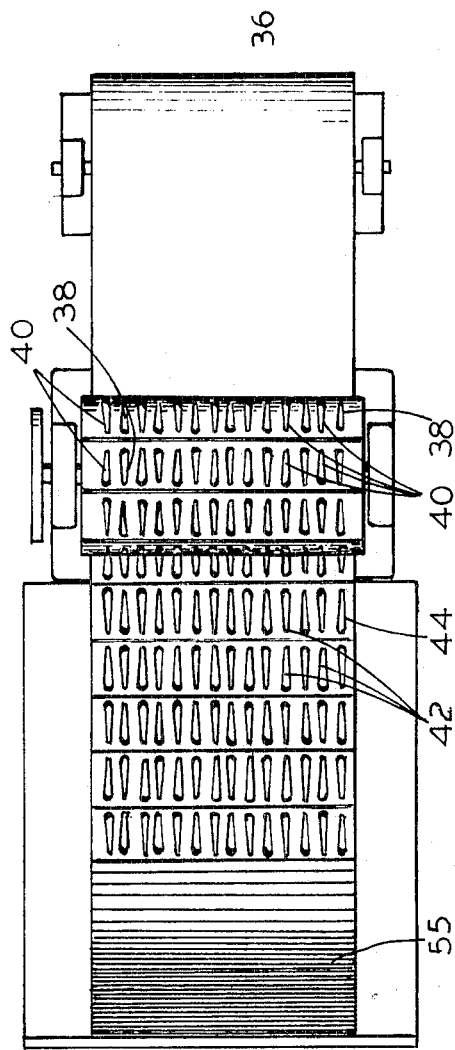
FIG. 8 is a schematic plan view of an apparatus for forming the filter media.
Figure 9:
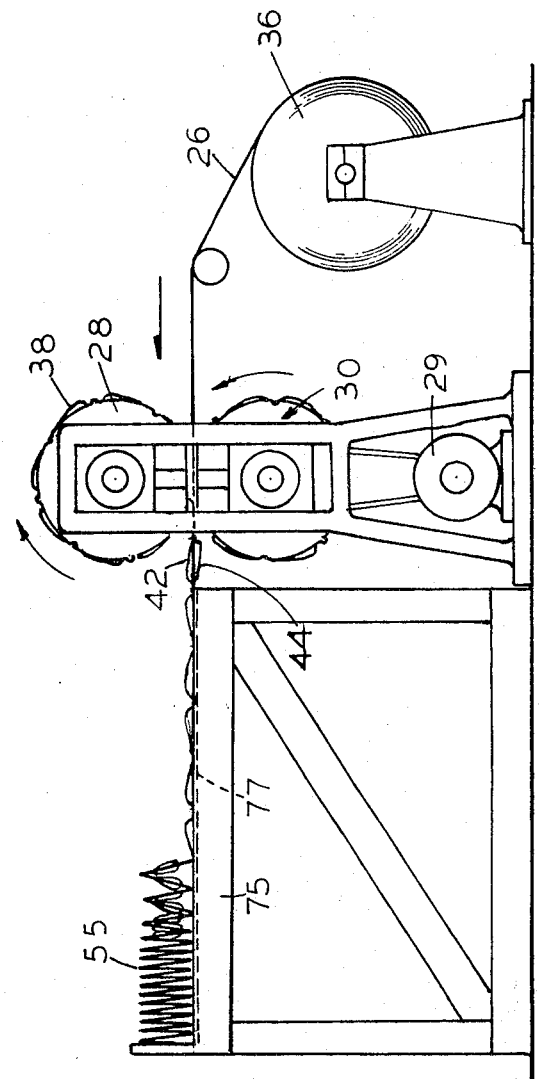
FIG. 9 is a side elevational view of the apparatus of FIG. 8.

In FIG. 7 there is shown a sheet of filter media 26 which as is indicated in FIGS. 8 and 9 is fed from a supply roll 36, in the direction of arrow A between opposed rolls 28 and 30. The rolls are preferably power driven as at 29. The rolls form the media with laterally extending spaced scoring or fold lines 32 and 34 which alternate in direction and define the individual panels of filter material to be and when arranged in zig zag form in the filter unit. The rolls are provided with alternate raised portions 38 and recesses 40 which are complementary and interfit as the filter media passes between the rolls. The raised portions 38 and recesses 40 of the rolls form integral inclined offset spacer ribs in the filter media, alternate ribs of which are formed upwardly as at 42, with the intervening ribs being formed downwardly and in an opposite direction and inclined oppositely as indicated at 44.

The media as supplied from the roll is relatively flexible and may include a resin or other substance that is curable by heat to render the sheet area relatively stiff. By maintaining the forming rolls 28 and 30 suitably heated during the forming operation, the media upon leaving the rolls with the spacer ribs 42 and 44 formed therein is rendered relatively stiff such that the offset ribs formed by the rolls will retain their shape permanently for all practical purposes. The formed filter media after leaving the rolls moves along the work table 75, which is of sufficient length, and provided with grooves 77 to accommodate the ribs 44 formed on the underside of the media. The formed media is folded zig zag into pleats at the score lines 32 and 34 to form a series of panels 46 and 48 which may take the general zig zag configuration as is indicated at 55 in FIGS. 7, 8 and 9. When a sufficient number of panels has been formed and folded into zig zag configuration, in the manner indicated in FIG. 9, to provide the requisite number of panels for a filter core or unit, the folded panels thus formed are severed from the supply along a score line and core is then arranged in a frame as indicated in FIG. 1.

In FIGS. 10 to 15 there is shown, on a relatively large scale, the general shape of the tapered raised offsets formed in the sheet filter media. As shown in FIG. 10 the raised offset spacers 42 gradually increase in width and height as their ends approach the scoring 34, or conversely taper off in width and height as they approach the offset creases 32. The oppositely offset tapered spacers 44 shown as depressed, are relatively shallow and of less width adjacent the scoring 34 and gradually increase in width and depth as they approach the scorings 32. As is indicated in FIGS. 11, 12 and 13, while the ribs are indicated as somewhat arcuate in cross-section, they may be of shallow V-formation or shallow V-formation with slightly flat apices, the ribs of adjacent panels being adapted for point or line contact with one another when the panels are in the folded zig zag arrangement to assure proper spacing of the adjacent panels and to prevent collapse of the panels against one another as by differential pressure exerted upon the filter media by the passage of air through the filter.

In FIG. 15, the apices 50 of the offset ribs 44 will contact each other when the panel is folded along the score 34. It is desirable that the apices have sufficient width to provide a reasonable tolerance to assure that contact is effected between the apices of the ribs of adjacent panels. The apices 52 of the ribs 42 shown in FIG. 14 will contact the corresponding ribs of the adjacent panels, not shown, when the panels are folded on the score lines 32 and 34.

In FIG. 2 wherein a sectional view is illustrated, successive panels 60, 62, 64 and 66 are shown folded on the upstream score lines 32, and the downstream score lines 34. The panel 60 has an offset or rib shown in section at 42 which bears against the end wall 68 of the filter frame 20, such offset serving to space the panel in inclined relation to the wall 68 to provide a tapering outlet pocket. The filter panel 60 also has an offset or rib 44 shown in elevation, the apex 50 of which abuts the apex 50 of the offset or rib 44 of the panel 62 to provide an inlet pocket. It will further be evident in FIG. 2 that the apices 52 of the ribs 42 of the panels 62 and 64 are in contact. The ribs 42 of the panels 62 and 64 maintain the tapered relationship between the planar body portions of adjacent panels in the unribbed area 70.

In FIG. 2 it will be seen that air flowing into the filter in the direction of arrows I will percolate through the panels both through the planar areas 70 as well as the inclined spacer rib or offset areas, and such air will leave the filter on the downstream side as indicated by the arrows O.

In FIG. 3 which is a section taken through the filter and through the spacer ribs 44, air will enter the filter as indicated by the arrow I between the panel 60 and panel 62 and between panels 64 and 66, and will leave the filter through the space between frame 68 and panel 60 and between panels 62 and 64 as indicated generally by the arrows O.

In FIG. 4 which is a section taken through the planar unribbed areas 70 of the filter panels, air enters the filter as indicated by arrows I between the panels 60 and 62, and panels 64 and 66, such air percolating through the filter media and leaving the filter as indicated by arrows O between frame 68 and panel 60, panels 62 and 64, and 66 and 67.

In practice inclined offsets or ribs may have a maximum offset of $3/16$ to $1/4$ of an inch so as to provide a pocket $3/8$ to $1/2$ inch wide at the inlet or outlet openings.

The ribs may be spaced about one inch apart, with the spacing between ribs on the same side being two inches. The width of the filter panels or flanks between adjacent folds may be varied, and when the depth is increased to provide deeper pockets and extended filter area, the ribs may be offset slightly more if desired. The spacing between the ribs may vary in accordance with the stiffness of the media to resist the differential pressure of air flow passing through the media, and since the ribs on the downstream side withstand the differential pressure, whereas the ribs on the upstream side merely establish spacing, the downstream ribs may have a greater offset if desired. On the other hand since the upstream surfaces of the media will be subject to accumulations of contaminants, it may be desirable to provide a slightly wider spacing between panels adjacent the downstream folds. By providing the same effect from either side, so that a filter cartridge can be placed in use, without regard to which side is upstream.

When the requisite number of pleats or folds have been formed for a particular cartridge, the media thus formed is placed in a frame, and the end edges sealed to the frame side members, and the zig zag edges sealed to the frame top and bottom members.

The filter media may comprise a filter paper, or a fiberglass or synthetic mat supplied in roll form of suitable width, and may include uncured thermo setting resins or thermo plastic resins. The media whether coated, saturated or sprayed with a phenolic or other heat curable binder, will be cured on passage through the rolls 28 and 30 which may be heated for the purpose in any suitable way as by electric heat, steam or otherwise. The media will pass through the rolls at such rate as to effect curing of the mat and binder so that the media and the offsets 42 and 44 will be rigidly formed and self sustaining. In practice, to speed up the forming, the filter media may be heated prior to entry between the rolls to a degree sufficient to render the media readily formable, and the formed media upon leaving the rolls could be subjected to further heat to effect curing of the curable substance associated with the media to improve its rigidity.

While a single embodiment with variations of the invention has been illustrated and described, it is to be understood that the invention is not limited thereto. As various changes in the construction and arrangement may be made without departing from the spirit of the invention, as will be apparent to those skilled in the art, reference

What is claimed is:

1. An air filter comprising a filter core having a zig-zag series of like self sustaining relatively planar rectangular panels connected by alternate upstream and downstream folds, the upstream folds being uniformly spaced to provide a series of like substantially V pockets for air to enter, and the downstream folds being uniformly spaced to provide a series of substantially V pockets for filtered air to leave, each of said panels having a plurality of spacer ribs extending in a direction generally transversely of the folds with each spacer rib extending substantially the distance between folds, the spacer ribs being formed integrally of the filter media by outwardly offsetting from the plane of the panels, the spacer ribs of adjacent panels being aligned and of a tapering height to provide line contact substantially along their entire length between ribs of adjacent panels to maintain the inclined spacing between adjacent panels against the differential pressure of air flow through the filter media of the panels.

2. A filter in accordance with claim 1 wherein the core with its panels and folds disposed vertically is disposed in an open rectangular frame having top and bottom and side members with the end edges of the media sealing engaged to the inside of the side members, and the upper and lower edges of the successive panels are sufficiently sealed to the respective top and bottom frame members to prevent bypass.

3. A filter according to claim 1 wherein the panel sections of the core are provided with ribs offset alternately in opposite directions, with the ribs on one side inclined oppositely to the ribs on the other side, and with the ribs on the inlet side of adjacent panels being aligned for point contact whereby to positively space the panels to form the inlet pockets.

4. A filter according to claim 1 wherein the planar panels are formed of filter media molded and cured to form the panels and spacer ribs.

References Cited

UNITED STATES PATENTS

| | | | |
|---|---|---|---|
| 2,569,243 | 9/1951 | Kovacs | 210—493 |
| 2,654,440 | 10/1953 | Robinson | 210—508 |
| 2,936,855 | 5/1960 | Allen et al. | 55—498 |
| 3,025,964 | 3/1962 | Summers et al. | 55—498 |
| 3,058,594 | 10/1962 | Hultgren | 210—487 |
| 3,258,900 | 7/1966 | Harms | 55—500 |
| 3,392,843 | 7/1968 | Mumby | 210—493 |
| 3,397,518 | 8/1968 | Rogers | 55—497 |
| 3,410,062 | 11/1968 | Hart | 55—497 |

FRANK W. LUTTER, Primary Examiner

B. NOZICK, Assistant Examiner

U.S. Cl. X.R.

55—521; 210—493